(12) United States Patent
Klug (10) Patent No.: US 6,604,457 B2
(45) Date of Patent: Aug. 12, 2003

(54) PROCESS AND APPARATUS FOR EMBOSSING GRAPHITE ARTICLES

(75) Inventor: Jeremy H. Klug, Brunswick, OH (US)

(73) Assignee: GrafTech Inc., Parma, OH (US)

( * ) Notice: Subject to any disclaimer, the term of this patent is extended or adjusted under 35 U.S.C. 154(b) by 0 days.

(21) Appl. No.: 09/853,389

(22) Filed: May 11, 2001

(65) Prior Publication Data

US 2002/0174782 A1 Nov. 28, 2002

(51) Int. Cl.[7] .............................. B44C 1/24; B29C 59/04
(52) U.S. Cl. ................ 101/32; 101/6; 101/23; 101/28; 264/284; 72/197; 83/880; 83/863; 83/116
(58) Field of Search .............................. 101/3.1, 4, 5, 6, 101/22, 23, 28, 32, 375; 226/193; 271/272; 83/899, 880, 882, 883, 884, 885, 886, 863, 864, 115, 116, 117, 113, 678, 927; 72/197, 198, 191; 493/58, 59, 60, 64; 492/1, 2, 22, 28, 30, 31

(56) References Cited

U.S. PATENT DOCUMENTS

| 262,369 A | * | 8/1882 | Cameron | 101/6 |
|---|---|---|---|---|
| 1,050,879 A | * | 1/1913 | Wadsworth | 72/188 |
| 3,150,707 A | * | 9/1964 | Howell | 72/177 |
| 3,325,302 A | * | 6/1967 | Hosfeld | 264/137 |
| 3,404,061 A | | 10/1968 | Shane et al. | 161/125 |
| 3,827,269 A | * | 8/1974 | Hoagland et al. | 205/666 |
| 4,498,390 A | * | 2/1985 | Bowling et al. | 101/365 |
| 4,895,713 A | | 1/1990 | Greinke et al. | 423/448 |
| 5,466,317 A | * | 11/1995 | Lause et al. | 156/244.11 |
| 5,902,762 A | | 5/1999 | Mercuri et al. | 501/99 |

OTHER PUBLICATIONS

International Publication No. WO 00/64808, International Publication Date Nov. 2, 2000, "Flexible Graphite Article And Method Of Manufacture", UCAR Graph–Tech Inc.

* cited by examiner

Primary Examiner—Leslie J. Evanisko
(74) Attorney, Agent, or Firm—Paul S. Chingott (57) ABSTRACT

Apparatus and methods are provided for the embossing of a sheet of flexible graphite material between a pair of embossing rollers. The embossing rollers include a primary embossing roller and a backup roller. The primary embossing roller has an embossing pattern defined thereon. One or both of the rollers include a raised stabilization area adjacent a periphery of the embossing pattern. The raised stabilization area preferably has a roughened outer surface for better gripping the sheet of flexible graphite material. The raised stabilization areas apply a stabilizing force to the sheet adjacent the periphery of the embossing pattern, thereby limiting egress of the material laterally away from the embossing pattern. The roughened surfaces increase the grip of the raised areas upon the sheet, thus aiding in pulling the sheet between the rollers and also aiding in the application of lateral stabilization forces to the sheet.

28 Claims, 3 Drawing Sheets

PROCESS AND APPARATUS FOR EMBOSSING GRAPHITE ARTICLES

TECHNICAL FIELD

The present invention relates generally to processes and systems for embossing sheets of flexible graphite material, and more particularly to processes for reducing warping of the graphite material during the embossing process. The articles formed by the embossing process may be used to form components of an electrochemical fuel cell.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

One limiting factor to the use of graphite materials, especially flexible graphite materials, as components for PEM fuel cells is the definition of a pattern embossed on the material, which, if not sufficient, can interfere with operation of the fuel cell, by permitting leaking of fluids, or not permitting sufficient fluid flow through the fuel cell, or changing load and/or current paths through the cell.

Graphite's are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites by definition possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be chemically treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been chemically or thermally expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material is typically within the range of from about 0.04 g/cc to about 1.4 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude typically, for the "c" and "a" directions.

This considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and substantially less in the direction parallel to the major faces of the flexible graphite sheet ("a" direction). In applications such as electrodes for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the major surfaces of the flexible graphite sheet is relatively high, while it is relatively low in the "c" direction transverse to the major surfaces.

Flexible graphite sheet can also be provided with channels, which are preferably smooth-sided, and which pass between the parallel, opposed surfaces of the flexible graphite sheet and are separated by walls of compressed expanded graphite. When such a flexible graphite sheet functions as an electrode in an electrochemical fuel cell, it is placed so as to abut the ion exchange membrane, so that the "tops" of the walls of the flexible graphite sheet abut the ion exchange membrane.

One problem which is often encountered in the embossing of articles from sheets of flexible graphite materials, is that the articles can warp or tear due to the forces exerted upon the relatively thin sheet of flexible graphite material by the embossing rollers.

There is a continuing need for improved processes for the manufacture of graphite articles by various forming techniques such as rotary embossing, and there is a need for the prevention of the warping and tearing of the graphite materials during the embossing process. The present invention provides such improved processes, which are particularly useful in the manufacture of materials which can be formed into components of electrochemical fuel cells.

SUMMARY OF THE INVENTION

The present invention addresses these problems by providing raised stabilization surfaces surrounding the periphery of an embossing pattern on the embossing roller, so that the raised stabilization surfaces will help control movement of the flexible graphite sheet through the embossing rollers, and will also control the tendency of the flexible graphite material to move laterally away from the embossing pattern due to the pressures exerted upon the material by the embossing roller.

The present invention provides a process of embossing a sheet of flexible graphite material which may be resin impregnated. The process comprises:

(a) providing an embossing roller having an embossing pattern defined thereon with a raised stabilization area adjacent a periphery of the embossing pattern; and (b) applying a stabilizing force to the sheet adjacent the periphery of the embossing pattern with the raised stabilization area and thereby limiting egress of the material laterally away from the embossing pattern.

The raised stabilization area preferably has a roughened surface to increase its grip upon the sheet of flexible graphite material. Thus, the raised stabilization area will grip the sheet and pull the sheet past the embossing area.

The raised stabilization areas may include circumferential portions which extend circumferentially around at least a part of the embossing roller, and they also include transverse portions which extend across a portion of the width of the embossing roller.

In another embodiment, a method is provided of embossing a sheet of flexible graphite material, which method includes:

(a) providing a pair of embossing rollers, including a primary embossing roller and a backup roller, the primary embossing roller having an embossing pattern defined thereon;

(b) providing at least one of said rollers with a first roughened surface area; and (c) rotating the rollers, and gripping the sheet between the rollers with the roughened surface area and thereby pulling the sheet through the rotating rollers.

The roughened surface area is preferably a raised area. The raised area may have a variable height complementary to a height of an opposing surface of the other of the rollers, so that a substantially constant gap is provided between the raised surface area and the opposing surface as the rollers rotate.

Accordingly, it is an object of the present invention to provide improved processes for the manufacture of articles from sheets of flexible graphite material.

Another object of the present invention is the reduction of warpage of articles formed by roller embossing sheets of flexible graphite material.

And another object of the present invention is the provision of improved systems for pulling sheets of flexible graphite material between a pair of embossing rollers.

And another object of the present invention is the provision of improved fixed gap embossing rollers for use with sheets of flexible graphite materials.

And another object of the present invention is the provision of apparatus and methods for manufacturing of materials suitable for use as components of fuel cells.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than about six weight percent. More preferably, the graphite employed for the present invention will have a purity of at least about 98%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, eliminates through-plane permeability while increasing handling strength, i.e. stiffness, of the flexible graphite sheet as well as "fixing" the morphology of the sheet. Suitable resin content is preferably at least about 5% by weight, more preferably about 10 to 45% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolac phenolics.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a starting density of about 0.1 to about 1.1 g/cc, is thereafter processed to change the void condition of the sheet. By void condition is meant the percentage of the sheet represented by voids, which are generally found in the form of entrapped air. Generally, this is accomplished by the application of pressure to the sheet (which also has the effect of densifying the sheet) so as to reduce the level of voids in the sheet, for instance in a calender mill or platen press. Advantageously, the flexible graphite sheet is densified to a density of at least about 1.3 g/cc (although the presence of resin in the system can be used to reduce the voids without requiring densification to so high a level).

The void condition can be used advantageously to control and adjust the morphology and functional characteristics of the final embossed article. For instance, thermal and electrical conductivity, permeation rate and leaching characteristics can be effected and potentially controlled by controlling the void condition (and, usually, the density) of the sheet prior to embossing. Thus, if a set of desired characteristics of the final embossed article is recognized prior to manipulation of the void condition, the void condition can be tailored to achieve those characteristics, to the extent possible.

Advantageously, especially when the final embossed article is intended for use as a component in an electrochemical fuel cell, the resin-impregnated flexible graphite sheet is manipulated so as to be relatively void-free, to optimize electrical and thermal conductivities. Generally, this is accomplished by achieving a density of at least about 1.4 g/cc, more preferably at least about 1.6 g/cc depending on resin content, indicating a relatively void-free condition.

The calendered flexible graphite sheet is then passed through an embossing apparatus as described herein below, and thereafter heated in an oven to cure the resin. Depending on the nature of the resin system employed, and especially the solvent type and level employed (which is advantageously tailored to the specific resin system, as would be familiar to the skilled artisan), a vaporization drying step may be included prior to the embossing step. In this drying step, the resin impregnated flexible graphite sheet is exposed to heat to vaporize and thereby remove some or all of the solvent, without effecting cure of the resin system. In this way, blistering during the curing step, which can be caused by vaporization of solvent trapped within the sheet by the densification of the sheet during surface shaping, is avoided. The degree and time of heating will vary with the nature and amount of solvent, and is preferably at a temperature of at least about 65° C. and more preferably from about 80° C. to about 95° C. for about 3 to about 20 minutes for this purpose.

One embodiment of an apparatus for continuously forming resin-impregnated and calendared flexible graphite sheet is shown in International Publication No. WO 00/64808 the disclosure of which is incorporated herein by reference.

Figure 1:
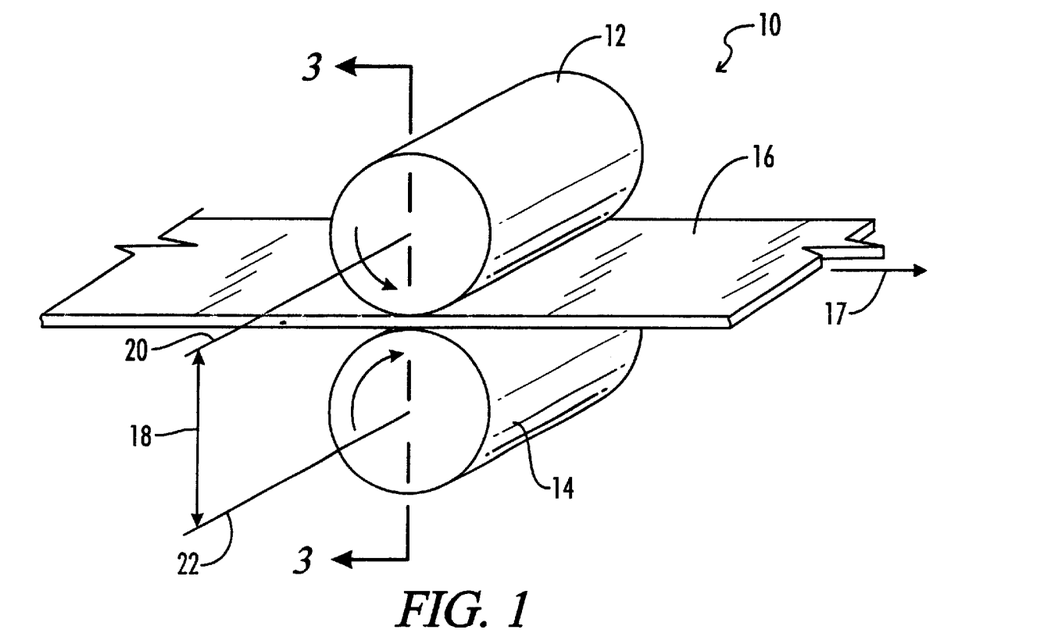
FIG. 1 is a perspective schematic view of an elongated sheet of flexible graphite material passing between a pair of embossing rollers.

Referring now to the drawings, FIG. 1 is a schematic illustration of a system 10 whereby a pair of embossing rollers including a primary embossing roller 12 and a backup roller 14 are used to emboss a pattern upon a flexible sheet 16 of graphite material. The backup roller 14 may also be referred to as a landing roller 14. In FIG. 1, the graphite material 16 is moving from left to right as it passes between the embossing rollers 12 and 14, as indicated by arrow 17.

It will be understood that the sheet 16 has previously been formed in a conventional process whereby the expanded graphite particles have been pressed into a mat which is subsequently impregnated with resin, dried and cured and then calendered to form a flexible sheet of resin impregnated graphite material. The embossing processes of the present invention may also be utilized upon flexible sheets of graphite material which have not been resin impregnated.

Typical widths of the sheet 16 of flexible graphite material, when manufacturing articles such as components of fuel cells, are in the range of from about two inches to about nine inches.

The embossing rollers 12 and 14 may be of either the fixed gap type or the air loaded type. As will be understood by those skilled in the art, fixed gap rollers have a fixed spacing 18 between their axes of rotation 20 and 22.

Air loaded rollers, on the other hand, have one of the rollers mounted upon pneumatic rams which provide a constant pressure, and the one roller is allowed to float relative to the other so that the spacing 18 between the rollers is not fixed.

The type of embossing rollers, that is air loaded versus fixed gap, will also have a large influence on the operating conditions necessary for proper product definition. Although a floating roller system would be preferred in many situations, due to its better ability to control the pressures applied to the sheet 16 of flexible graphite material, there will be design situations in which fixed gap rollers will have to be used due to the need for tightly controlling the dimensional tolerances of the articles being manufactured. Particularly when these fixed gap type of rollers are utilized, there can be very high pressures applied at certain points between the rollers, and the proper design of the various gripping surfaces as proposed herein can significantly aid in the elimination of excessive forces and the control of material movement so as to substantially reduce warpage of the articles being manufactured by the embossing process.

The present invention specifically addresses the problem of the warping of embossed articles formed by passing the sheets 16 between the embossing rollers 14 and 16. As will be appreciated by those skilled in the art, when the flexible sheet of graphite material 16 passes between the embossing rollers 12 and 14, it is subjected to very substantial pressures, and there is significant movement of graphite material and resin laterally (in the plane of sheet 16) as the same is displaced by the raised areas of the embossing pattern of the primary embossing roller 12. Additionally, there are lateral forces placed upon the sheet 16 by the rotating rollers 12 and 14 which grip the sheet 16 therebetween. The degree of warping which may occur is dependent upon material parameters and processing parameters.

Figure 2:
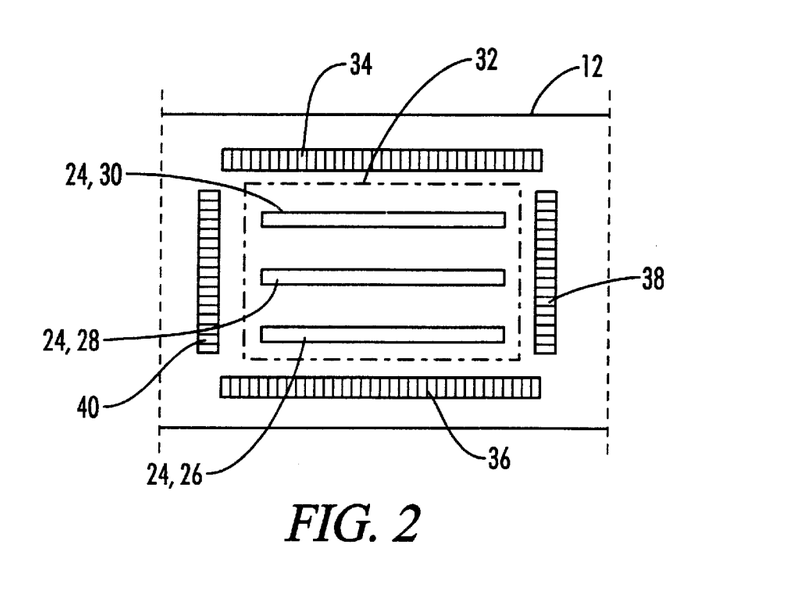
FIG. 2 is a laid out view of the outer surface of the primary embossing roller showing an embossing pattern defined thereon with a plurality of raised stabilization areas oriented both circumferentially around the roller and laterally across the width of the roller.
Figure 3:
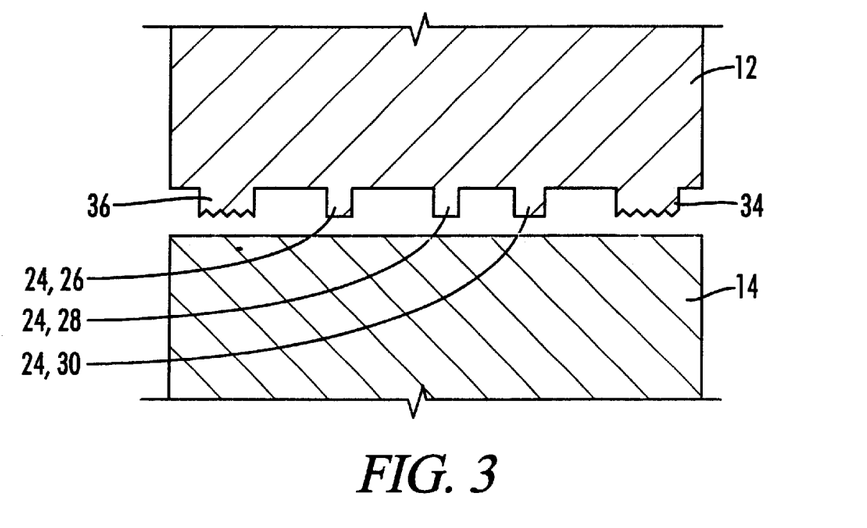
FIG. 3 is a schematic elevation sectioned view taken along lines 3—3 of FIG. 1 showing a primary embossing roller including an embossing pattern with raised stabilization areas on either side thereof, along with a plain cylindrical backup roller.

As shown in FIG. 3, the primary embossing roller 12 has an embossing pattern 24 defined thereon, which in the illustration of FIG. 3 includes three embossing features 26, 28, and 30. In the schematic illustration of FIGS. 2 and 3, these embossing features 26, 28 and 30 are ribs which extend partially around the circumference of the primary embossing roller 12, and will thus act to form parallel grooves in the article being formed in the sheet 16 of graphite material. It will be understood that the embossing pattern 24 is only schematically illustrated, and could include any desired shape which is to be impressed in the surface of the sheet 16 of flexible graphite material. For example, the embossing pattern 24 could be such as to form a material useful in the formation of a component of a fuel cell such as an electrode or a flow field plate.

In FIG. 2, the phantom lines 32 are used to schematically illustrate the periphery of the embossing pattern 24. As will be understood by those skilled in the art, when the sheet 16 passes between the embossing rollers 12 and 14, substantial compressive forces are applied to the sheet 16 of material, thus causing the material to tend to flow laterally in the plane of sheet 16 away from the embossing pattern.

The embossing rollers also often utilize very tight pinch points to form "cut out" grooves between components in a continuous manufacturing process, so as to nearly sever the components thus allowing them to be easily separated. These tend to be particularly difficult areas of warpage.

The present invention provides a means for controlling and limiting this undesired movement of the graphite material by the provision of raised stabilization areas such as 34, 36, 38 and 40. The stabilization areas 34 and 36 extend partially around the circumference of the primary embossing roller 12 on either side of the embossing pattern 32, and the raised stabilization areas 38 and 40 each extend transversely across a portion of the width of the roller 12. The raised stabilization areas 34, 36, 38 and 40 may be described as being located adjacent the periphery 32 of the embossing pattern 24.

The function of the raised stabilization areas is two-fold. First, they provide areas of increased pressure contact between the rollers 12 and 14 adjacent the periphery 32 of the embossing pattern 24 so as to apply a stabilizing force to the sheet 16 adjacent the periphery 32 of the embossing pattern 24 and to thereby limit egress of the graphite material and resin comprising the sheet 16 laterally away from the embossing pattern 24.

Figure 6:
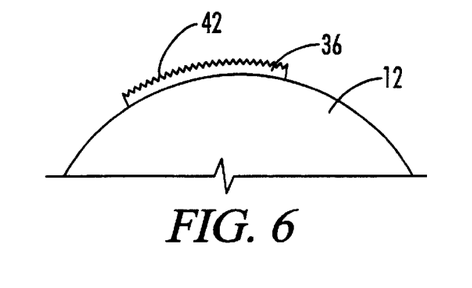
FIG. 6 is a schematic end elevation view of a portion of one of the rollers showing a raised stabilization area having a toothed roughened surface.
Figure 7:
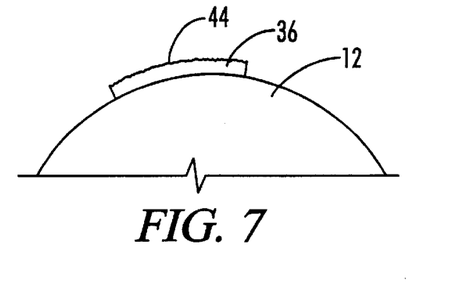
FIG. 7 is a view similar to FIG. 6, wherein the raised stabilization area simply has a roughened surface such as that that would be provided by blasting of the raised surface with an abrasive particle.

The second function provided by the stabilization areas 34, 36, 38 and 40 is that the outer surfaces of these areas grip the sheet 16 and aid in pulling the sheet 16 past the embossing rollers 12 and 14. This gripping function is further improved by providing the raised stabilization areas with a roughened surface whereby the gripping is increased due to the roughened surface. For example, as shown in FIG. 6, the raised stabilization area 36 may have a plurality of teeth 42 formed thereon to define the roughened surface. Alternatively, as shown in FIG. 7, the raised stabilization area 36 may have a roughened surface 44 such as that that would be provided by abrasive blasting of the surface with sand or other abrasive particles. In general, the roughened surface is simply a surface that is rougher than the remainder of the outer surface of the roller 12 surrounding the embossing pattern 24. As will be understood by those skilled in the art, the outer surface of an embossing roller is typically highly polished so as not to stick to the flexible graphite sheet 16 in the area of the embossing pattern 24. Thus, any surface which is significantly rougher than a typical polished surface could function as the desired roughened surface.

It is also within the scope of the present invention to utilize raised stabilization areas which are not roughened but simply provide pinch points or points of higher pressure which tend to hold sheet 16 in place adjacent the periphery of the embossing pattern.

In the embodiment of FIG. 3, the embossing pattern 24 and the raised stabilization areas 34 and 36 are all defined upon the primary embossing roller 12, and the backup roller 14 is a smooth cylindrical roller.

Figure 4:
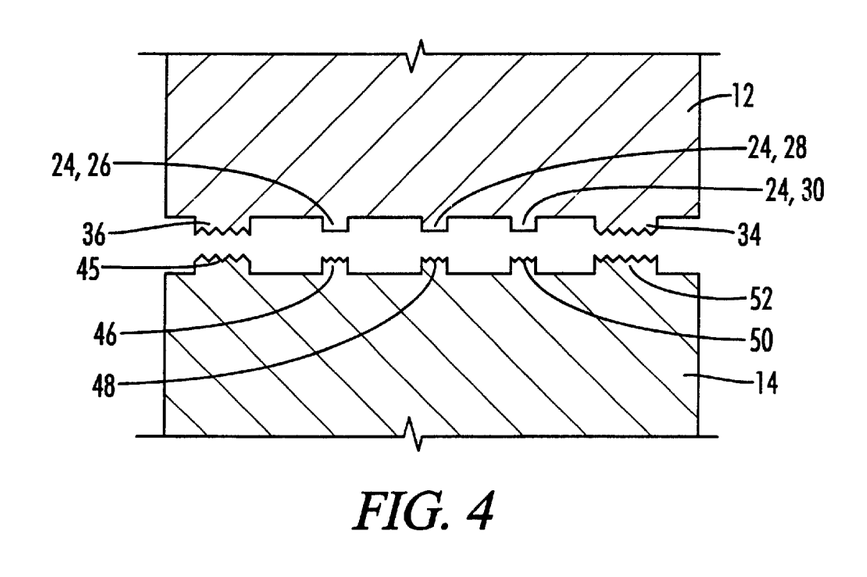
FIG. 4 is a view similar to FIG. 3 in which the backup roller includes a plurality of raised stabilization and gripping areas complementary to the raised stabilization areas and the embossing pattern of the primary embossing roller.

Alternatively, as shown in FIG. 4, both the primary embossing roller 12 and the backup roller 14 may include surface features. For example, in FIG. 4, the backup roller 14 includes raised stabilization areas 45, 46, 48, 50 and 52 located oppositely of stabilization area 36, and embossing features 26, 28 and 30, and stabilization area 34, respectively.

The various raised stabilization surfaces must be of the correct height to facilitate gripping and pulling of the sheet of graphite material 16 between the embossing rollers 12 and 14, but raised stabilization areas should not create tearing or rupture of the sheet 16. The desired height is dependent upon the cross section of the embossed pattern. For this reason, non-symmetric embossed patterns may require a dynamic height profile along the roller surface such as schematically illustrated in FIG. 5.

Figure 5:
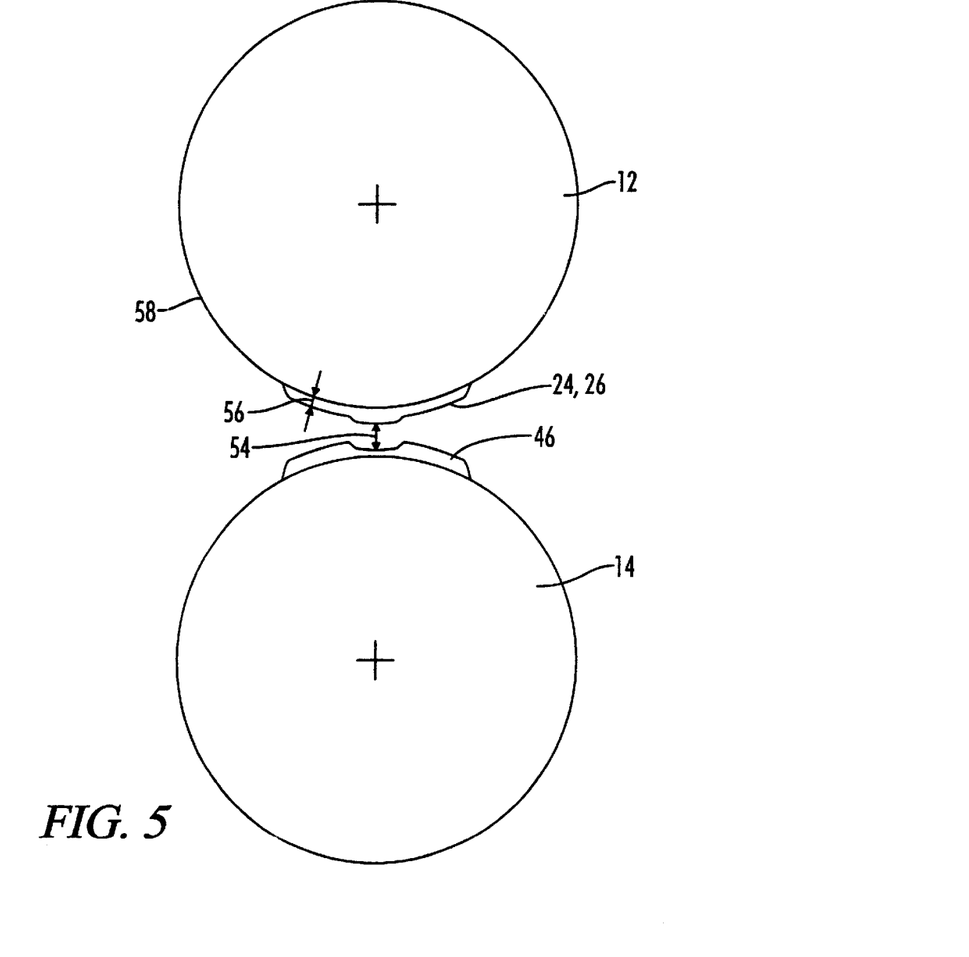
FIG. 5 is a schematic end elevation view of a pair of embossing rollers wherein the primary embossing roller has an embossing pattern feature defined thereon of irregular height, and wherein the backup roller has a raised stabilization area which also has a varying height complementary to that of the primary embossing roller so that a substantially constant gap is provided between the primary and backup embossing rollers as the rollers rotate.

As illustrated in FIG. 5, the raised stabilization area 46 should be constructed complementary to, for example, the embossing feature 26 upon the opposing roll 12. The embossing feature 26 has a variable height 56 above the outer surface 58 of embossing roller 12. The raised stabilization area 46 of backup roller 14 shown in FIG. 5 may be described as a raised area complementary to the embossing feature 26, so that a substantially constant gap 54 is maintained between the raised features 26 and 46 as the rolls 12 and 14 rotate pulling the sheet 16 therebetween.

By the appropriate design of the raised stabilization areas in combination with the design of the embossing pattern 24 itself, a substantial degree of control can be provided to the movement of the graphite material of sheet 16 as it passes between the embossing rollers 12 and 14. Appropriate design of these areas can limit undesired lateral movement of the graphite material and resin of sheet 16, thus substantially reducing undesired warping of the sheet 16 as it is embossed into the desired shape of the finished articles.

The raised areas may be integrally formed upon the rollers 12 and 14 such as by machining or the like, or they may be provided by the placement of shims upon the outer cylindrical surface of one or both of the rollers.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A process of embossing a sheet of flexible graphite material, comprising the steps of:

(a) providing an embossing roller having an embossing pattern defined thereon with a raised stabilization area adjacent a periphery of the embossing pattern; and (b) applying a stabilizing force to the sheet adjacent the periphery of the embossing pattern with the raised stabilization area, and thereby limiting egress of the material laterally away from the embossing pattern.

2. The process of claim 1, further comprising:

simultaneous with step (b), gripping the sheet with the raised stabilization area and pulling the sheet past the embossing roller with the raised stabilization area.

3. The process of claim 2, wherein:

step (a) further comprises providing the raised stabilization area with a roughened surface, whereby said gripping is increased due to the roughened surface.

4. The process of claim 1, wherein:

step (a) further comprises providing the raised stabilization area with a roughened surface, thereby increasing a gripping force between the raised stabilization area and the sheet.

5. The process of claim 4, wherein:

step (a) further comprises providing teeth on the raised stabilization area, said teeth defining said roughened surface.

6. The process of claim 4, wherein:

step (a) further comprises roughening the raised stabilization area by blasting the raised stabilization area with particles.

7. The process of claim 1, wherein:

in step (a), the raised stabilization area extends circumferentially around at least part of the embossing roller.

8. The process of claim 1, wherein:

in step (a), the raised stabilization area extends across a substantial part of the width of the embossing pattern.

9. A method of embossing a sheet of flexible graphite material comprising the steps of:

(a) providing a pair of embossing rollers including a primary embossing roller and a backup roller, the primary embossing roller having an embossing pattern defined thereon;

(b) providing at least one of said rollers with a first roughened surface area; and (c) rotating the rollers, and gripping the sheet between the rollers with the roughened surface area and thereby pulling the sheet through the rotating rollers.

10. The method of claim 9, wherein:

step (b) includes providing the other of said rollers with a second surface area complementary to said first roughened surface area, so that in step (b) the sheet is gripped between the first and second surface areas.

11. The method of claim 9, wherein:

in step (a) the pair of embossing rollers are fixed gap rollers; and in step (b), said first roughened surface area is also a raised area having a variable height, said variable height being complementary to a height of an opposing surface of the other of said rollers, so that a substantially constant gap is provided between said raised area and said opposing surface as said rollers rotate.

12. The method of claim 9, further comprising:

applying a stabilizing force to the sheet adjacent a periphery of the embossing pattern with the roughened surface area, and thereby limiting movement of the material laterally away from the embossing pattern.

13. The method of claim 9, wherein:

in step (b), the first roughened surface area extends circumferentially around at least part of said one roller.

14. The method of claim 9, wherein:

in step (b), the first roughened surface area extends across a majority of a width of said one roller.

15. The method of claim 9, wherein:

step (b) includes roughening said surface area by providing teeth on the surface area.

16. The method of claim 9, wherein:

step (b)) includes roughening said surface area by blasting the surface area with abrasive particles.

17. An apparatus for embossing a sheet of graphite material, comprising:

an embossing roller having an embossing pattern defined thereon, and having a raised stabilization area adjacent a periphery of the embossing pattern, wherein said raised stabilization area is positioned to limit egress of said graphite material of said sheet laterally away from said embossing pattern.

18. The apparatus of claim 17, wherein:

the raised stabilization area has a roughened outer surface.

19. The apparatus for embossing a sheet of graphite material according to claim 17 wherein said embossing pattern comprises a non-ribbed section next to said raised stabilization area.

20. The apparatus for embossing a sheet of graphite material according to claim 17 wherein said embossing roller comprises at least two more raised stabilization areas.

21. The apparatus for embossing a sheet of graphite material according to claim 17 said raised stabilization area positioned perpendicular to at least one rib of said embossing pattern.

22. An apparatus for embossing a sheet of graphite material, comprising:

a primary embossing roller;

a backup roller; and wherein at least one of said rollers includes a first roughened surface area for gripping the sheet between the rollers, wherein said first roughened surface area is positioned to limit egress of said graphite material of said sheet laterally away from an embossing pattern on said primary embossing roller.

23. The apparatus of claim 22, wherein:

the first roughened surface area includes teeth formed thereon.

24. The apparatus of claim 22, wherein:

the other of said rollers includes a second roughened surface area complementary to said first roughened surface area, so that the sheet can be gripped between the first and second roughened surface areas.

25. The apparatus of claim 22, wherein:

the first roughened surface area is also a raised area.

26. The apparatus of claim 22, wherein:

the rollers have a fixed distance between their axes of rotation.

27. The apparatus of claim 26, wherein:

said first roughened surface area is also a raised area having a variable height, said variable height being complementary to a height of an opposing surface of the other of said rollers, so that a substantially constant gap is provided between said raised surface area and said opposing surface as said rollers rotate.

28. The apparatus for embossing a sheet of graphite material according to claim 22 wherein said at least one roller further comprises at least two more roughened surface areas.

* * * * *